US012664762B2

(12) United States Patent
Annangi et al.

(10) Patent No.: US 12,664,762 B2
(45) Date of Patent: Jun. 23, 2026

(54) CONTINUOUS MODEL REFINEMENT VIA SYNTHETIC IMAGE GENERATION FROM NON-IMAGE FEEDBACK

(71) Applicant: GE Precision Healthcare LLC, Waukesha, WI (US)

(72) Inventors: Pavan Annangi, Bangalore (IN); Vikram Reddy Melapudi, Bangalore (IN); Hariharan Ravishankar, Bengaluru (IN); Deepa Anand, Bangalore (IN)

(73) Assignee: GE Precision Healthcare LLC, Waukesha, WI (US)

( * ) Notice: Subject to any disclaimer, the term of this patent is extended or adjusted under 35 U.S.C. 154(b) by 371 days.

(21) Appl. No.: 18/340,246

(22) Filed: Jun. 23, 2023

(65) Prior Publication Data

US 2024/0428567 A1      Dec. 26, 2024

(51) Int. Cl.
*G06V 10/774* (2022.01)
*G06T 7/00* (2017.01)
(Continued)

(52) U.S. Cl.
CPC .......... *G06V 10/774* (2022.01); *G06T 7/0012* (2013.01); *G06V 10/776* (2022.01);
(Continued)

(58) Field of Classification Search
CPC .... G06V 10/774; G06V 10/776; G06V 10/82; G06V 2201/03; G06V 2201/10;
(Continued)

(56) References Cited

U.S. PATENT DOCUMENTS

| | | | |
|---|---|---|---|
| 10,949,966 B2 * | 3/2021 | Lo | G06T 7/11 |
| 2019/0080206 A1 * | 3/2019 | Hotson | G06T 7/11 |

(Continued)

OTHER PUBLICATIONS

Ramesh, Ad. et al. "Hierarchical text-conditional image generation with clip latents." arXiv preprint arXiv:2204.06125v1 [cs.CV] Apr. 13, 2022, 27 pages.

(Continued)

*Primary Examiner* — Siamak Harandi
(74) *Attorney, Agent, or Firm* — Amin, Turocy & Watson, LLP

(57) ABSTRACT

Techniques are described for refining or updating medical image inferencing models post deployment using synthetic images generated from non-image data feedback. In an example, a system can comprise a memory that stores computer-executable components and a processor that executes the computer-executable components stored in the memory. The computer-executable components can comprise an image generation component that generates synthetic medical images based on feedback information associated with performance of a medical image inferencing model received in association with application of the medical image inferencing model to medical images in a deployment environment, wherein the feedback information excludes image data. The computer-executable components can further comprise a refinement component that updates the medical image inferencing model using the synthetic images and a model updating process.

20 Claims, 12 Drawing Sheets

(51) Int. Cl.
| | |
|---|---|
| *G06V 10/776* | (2022.01) |
| *G06V 10/82* | (2022.01) |
| *G16H 30/40* | (2018.01) |

(52) U.S. Cl.
CPC .... *G06V 10/82* (2022.01); *G06T 2207/20081* (2013.01); *G06T 2207/20084* (2013.01); *G06V 2201/03* (2022.01); *G06V 2201/10* (2022.01)

(58) Field of Classification Search
CPC ......... G06T 7/0012; G06T 2207/20081; G06T 2207/20084; G06T 11/60; G16H 30/40; G16H 15/00; G16H 50/50; G06N 5/041
See application file for complete search history.

(56) References Cited

U.S. PATENT DOCUMENTS

| | | | | |
|---|---|---|---|---|
| 2020/0311913 | A1* | 10/2020 | Soni | G06N 3/047 |
| 2022/0261494 | A1* | 8/2022 | Truong | G06N 3/084 |

OTHER PUBLICATIONS

Wang, L. et al. | "A Comprehensive Survey of Continual Learning: Theory, Method and Application." arXiv preprint arXiv:2302.00487v1 [cs.LG] Jan. 31, 2023, 32 pages.

Kirkpatrick, J. et al. | "Overcoming catastrophic forgetting in neural networks." Proceedings of the national academy of sciences 114.13 (2017): 3521-3526, 6 pages.

Chaudhry, A. et al. | "On tiny episodic memories in continual learning." arXiv preprint arXiv:1902.10486v4 [cs.LG] Jun. 4, 2019, 15 pages.

Shin, H. et al. | "Continual learning with deep generative replay." 31st Conference on Neural Information Processing Systems (NIPS 2017), Long Beach, CA, USA, 10 pages.

Yan, Sh., et al. | "Generative Negative Text Replay for Continual Vision-Language Pretraining." Computer Vision—ECCV 2022: 17th European Conference, Tel Aviv, Israel, Oct. 23-27, 2022, Proceedings, Part XXXVI. Cham: Springer Nature Switzerland, 2022, 17 pages.

* cited by examiner

Table 200 - Non-Image Feedback Examples

| AI Generated Feedback | Metadata | Clinical Reports Data | User Provided Feedback |
|---|---|---|---|
| Image Quality parameters | Acquisition parameters- Frequency, depth, gain etc. | Pathology (e.g., normal/abnormal) | Model result accuracy valuation |
| Localization/ detection of pathologies, artifacts<br><br>Content - landmark style - Contrast | Pediatric, Scanning depth, Depth of the object etc | Measurements of pathological regions<br><br>Characterization of nodule (echogenicity)<br><br>Description of other adjoining anatomies | Indication of one or more predefined failure modes selected via a drop-down menu |

FIG. 2

Multi-Task model
(E.g., Describes type of view presented)
 Confidence score
 Presence of 3 vessels and trachea
FIG. 3B
Thorax Localizer model
(E.g., Describes size of anatomy)
Thorax to be 60-80% of FOV. Measures Magnification.
FIG. 3A

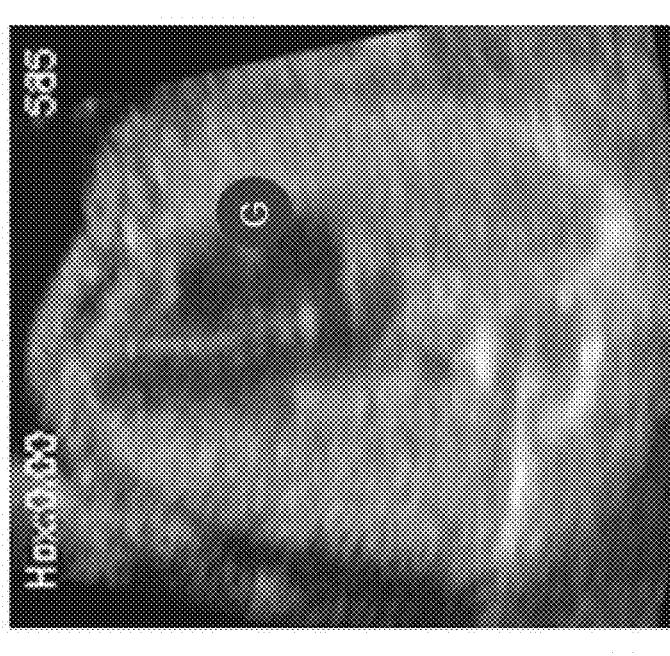
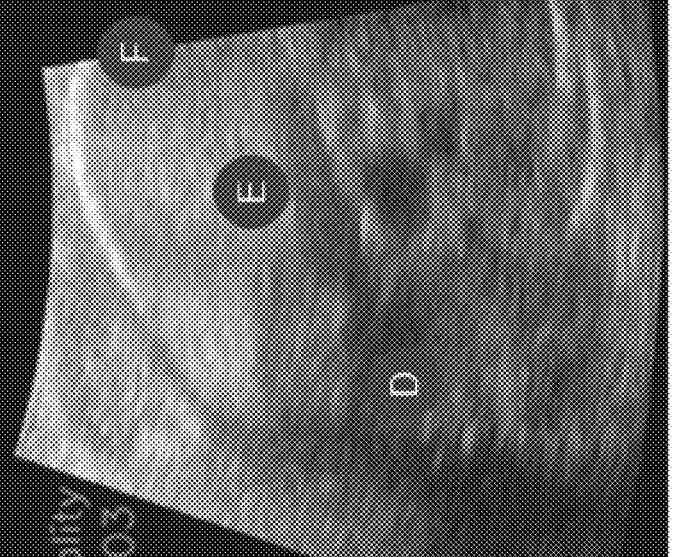
Quality regressor model ( 4CH )
(E.g., Describes task-specific image quality)
Score to measure quality of Heart axis view. Valves closed and mid-way ventricle and atria
FIG. 3D
Quality regressor model ( 3VT )
(E.g., Describes generic image quality)
Artifacts + content + FOV
→ Scored on a scale of 0-1
FIG. 3C

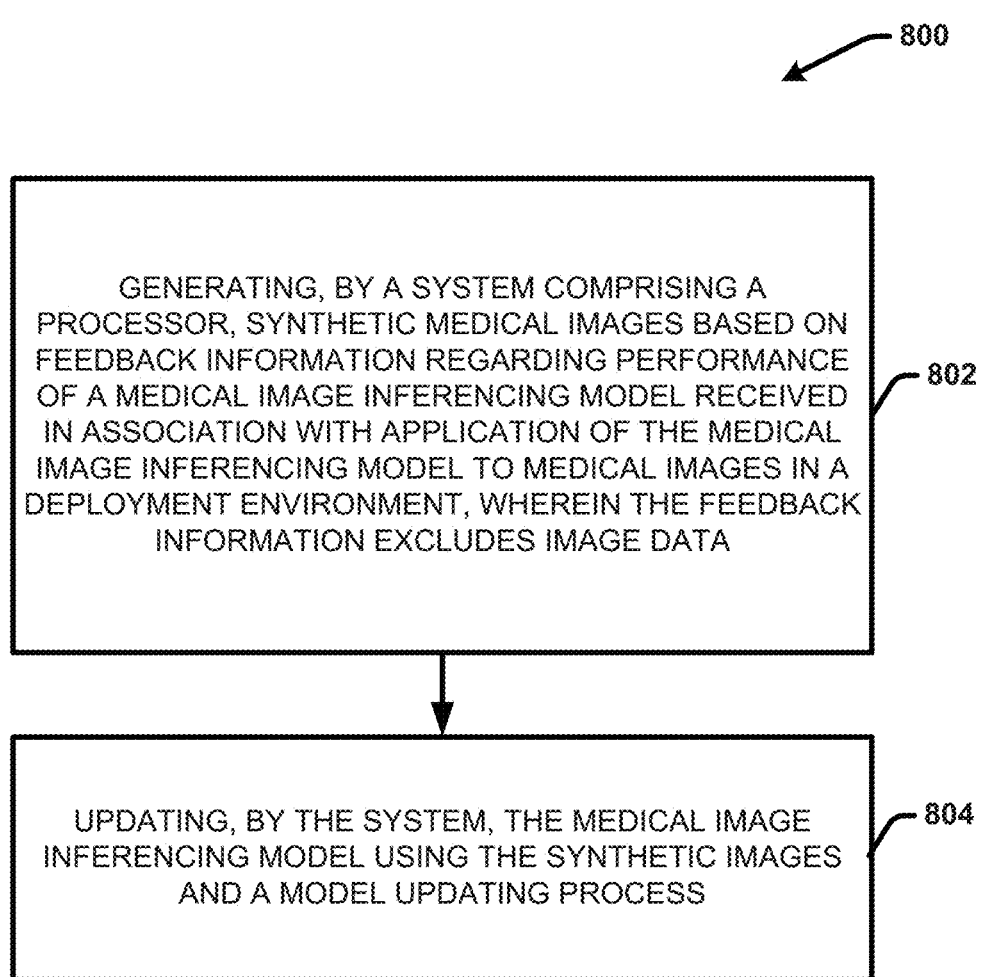

800

GENERATING, BY A SYSTEM COMPRISING A
PROCESSOR, SYNTHETIC MEDICAL IMAGES BASED ON
FEEDBACK INFORMATION REGARDING PERFORMANCE
OF A MEDICAL IMAGE INFERENCING MODEL RECEIVED
IN ASSOCIATION WITH APPLICATION OF THE MEDICAL
IMAGE INFERENCING MODEL TO MEDICAL IMAGES IN A
DEPLOYMENT ENVIRONMENT, WHEREIN THE FEEDBACK
INFORMATION EXCLUDES IMAGE DATA

802

UPDATING, BY THE SYSTEM, THE MEDICAL IMAGE
INFERENCING MODEL USING THE SYNTHETIC IMAGES
AND A MODEL UPDATING PROCESS

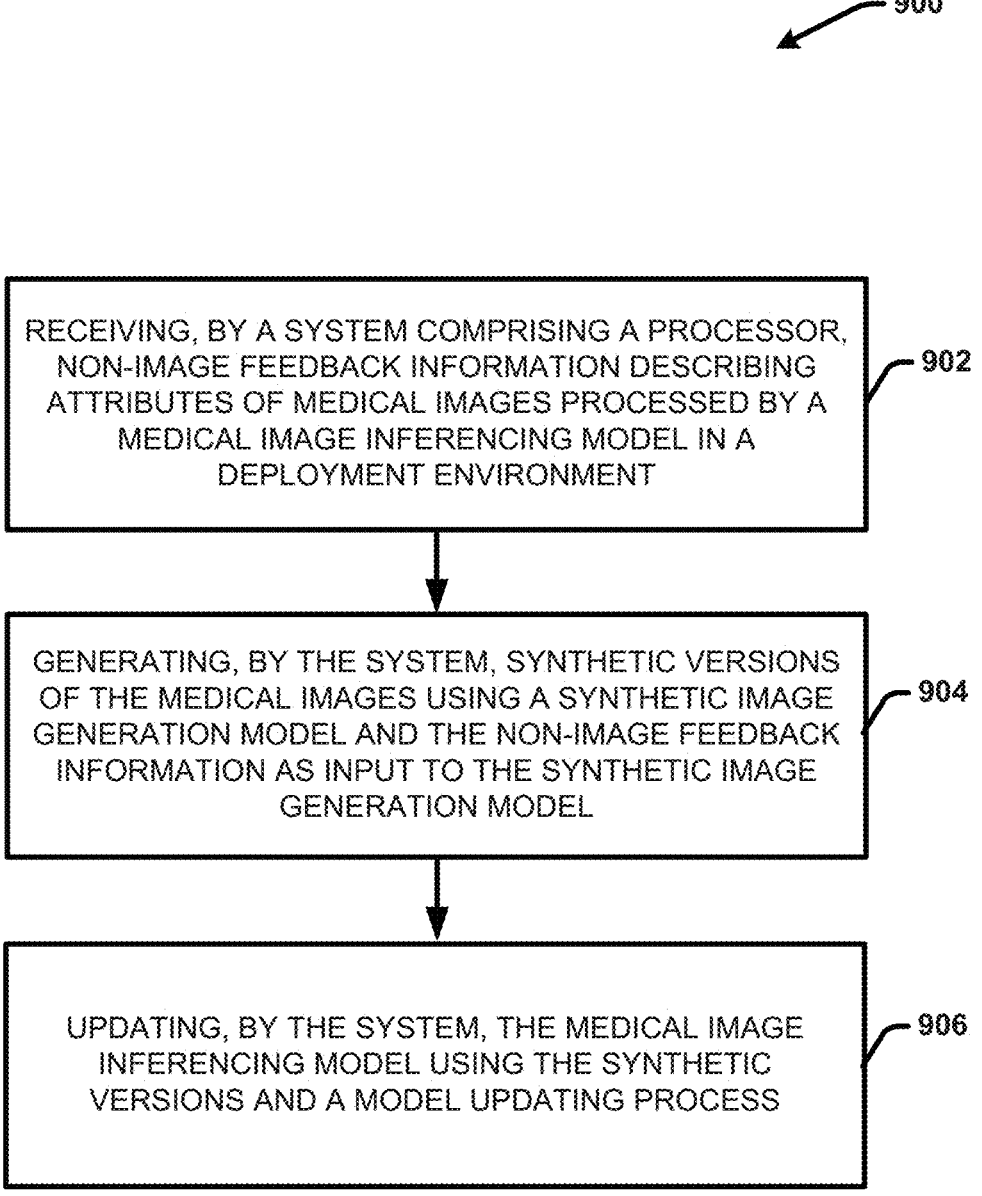

900

RECEIVING, BY A SYSTEM COMPRISING A PROCESSOR, NON-IMAGE FEEDBACK INFORMATION DESCRIBING ATTRIBUTES OF MEDICAL IMAGES PROCESSED BY A MEDICAL IMAGE INFERENCING MODEL IN A DEPLOYMENT ENVIRONMENT — 902

GENERATING, BY THE SYSTEM, SYNTHETIC VERSIONS OF THE MEDICAL IMAGES USING A SYNTHETIC IMAGE GENERATION MODEL AND THE NON-IMAGE FEEDBACK INFORMATION AS INPUT TO THE SYNTHETIC IMAGE GENERATION MODEL — 904

UPDATING, BY THE SYSTEM, THE MEDICAL IMAGE INFERENCING MODEL USING THE SYNTHETIC VERSIONS AND A MODEL UPDATING PROCESS — 906

FIG. 9

CONTINUOUS MODEL REFINEMENT VIA SYNTHETIC IMAGE GENERATION FROM NON-IMAGE FEEDBACK

TECHNICAL FIELD

This application relates to techniques for refining or updating medical image inferencing models post deployment using synthetic images generated from non-image data feedback.

BACKGROUND

Machine learning (ML) models are used in many medical image processing and analysis tasks like organ segmentation, anomaly detection, diagnosis classification, risk prediction, temporal analysis, image reconstruction, and so on. However, one of the fundamental problems in data-driven based machine learning approaches is that the final model inferencing capability is limited by the scope of the training data used to develop the model. To improve these models continuously over time, it is necessary to retrain and update the models to improve their performance based on feedback regarding model errors or failure modes observed in actual deployment environments (e.g., post initial training and development). It is often not possible to understand the failure modes without obtaining the input patient imaging data processed and/or generated by the models in the deployment environment. However, obtaining the deployment site patient imaging data can be difficult as there are often contractual restrictions and privacy issues that prohibit medical image data sharing between the model development site (i.e., the vendor site) and the model deployment site (e.g., the client site).

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments, systems, computer-implemented methods, apparatus and/or computer program products are described that facilitate refining or updating medical image inferencing models post deployment using synthetic images generated from non-image data feedback.

According to an embodiment, a system is provided that comprises a memory that stores computer-executable components, and a processor that executes the computer-executable components stored in the memory. The computer-executable components can comprise an image generation component that generates synthetic medical images based on feedback information associated with performance of a medical image inferencing model received in association with application of the medical image inferencing model to medical images in a deployment environment, wherein the feedback information excludes image data. The computer-executable components can further comprise a refinement component that updates the medical image inferencing model using the synthetic images and a model updating process (e.g., wherein the model updating process comprises a machine learning process).

In one or more embodiments, the feedback information comprises non-image data regarding attributes of at least some of the medical images, and wherein the feedback information excludes the medical images. For example, the at least some of the medical images can correspond to a subset of the medical images for which the performance of the medical imaging model is associated with one or more negative performance criteria. Additionally, or alternatively, the feedback information can comprise non-image data relating to results of the medical image inferencing model.

In various embodiments, the feedback information comprises text data and the image generation component generates the synthetic medical images using a synthetic image generation model machine learning model that generates the synthetic images based on the text data and without input data comprising the image data or additional image data. In some embodiments, the medical image inferencing model comprises a first machine learning model that was trained on a training dataset comprising first medical images, and the synthetic image generation model comprises a second machine learning model was trained on training textual description data associated with the first medical images. In some implementations, the computer-executable-components further comprise a training component that trains the first machine learning model and the second machine learning model.

In one or more embodiments, the feedback information can comprise automated assessment data regarding an assessment of at least one of, the performance, at least some of the medical images, or results of the medical image inferencing model, the automated assessment data generated using one or more artificial intelligence (AI) assessment models. Additionally, or alternatively, the feedback information can comprise metadata associated with at least some of the medical images. Additionally, or alternatively, the feedback information can comprise clinical report data associated with at least some of the medical images. Additionally, or alternatively, the feedback information can comprise user provided feedback regarding an assessment of at least one of, the performance, at least some of the medical images, or results of the medical image inferencing model. In some implementations of these embodiments, the computer-executable components can further comprise a feedback component that facilitates receiving the user provided feedback using one or more feedback tools associated with a medical imaging application in association with reviewing the results using the medical imaging application.

In some embodiments, elements described in connection with the disclosed systems can be embodied in different forms such as a computer-implemented method, a computer program product, or another form.

DESCRIPTION OF THE DRAWINGS

FIG. 2 presents a table summarizing some examples of non-image feedback that can be obtained for a medical image inferencing model in a deployment environment in accordance with one or more embodiments.

FIGS. 3A-3D present examples of automated assessment data that can be obtained via various types of AI assessment models regarding an assessment of the input images and/or the results of a medical image inferencing model.

FIG. 8 illustrates a block diagram of an example, non-limiting computer implemented method for refining or updating medical image inferencing models post deployment using synthetic images generated from non-image data feedback, in accordance with one or more embodiments of the disclosed subject matter.

FIG. 9 illustrates a block diagram of another example, non-limiting computer implemented method for refining or updating medical image inferencing models post deployment using synthetic images generated from non-image data feedback, in accordance with one or more embodiments of the disclosed subject matter.

DETAILED DESCRIPTION

Figure 1:
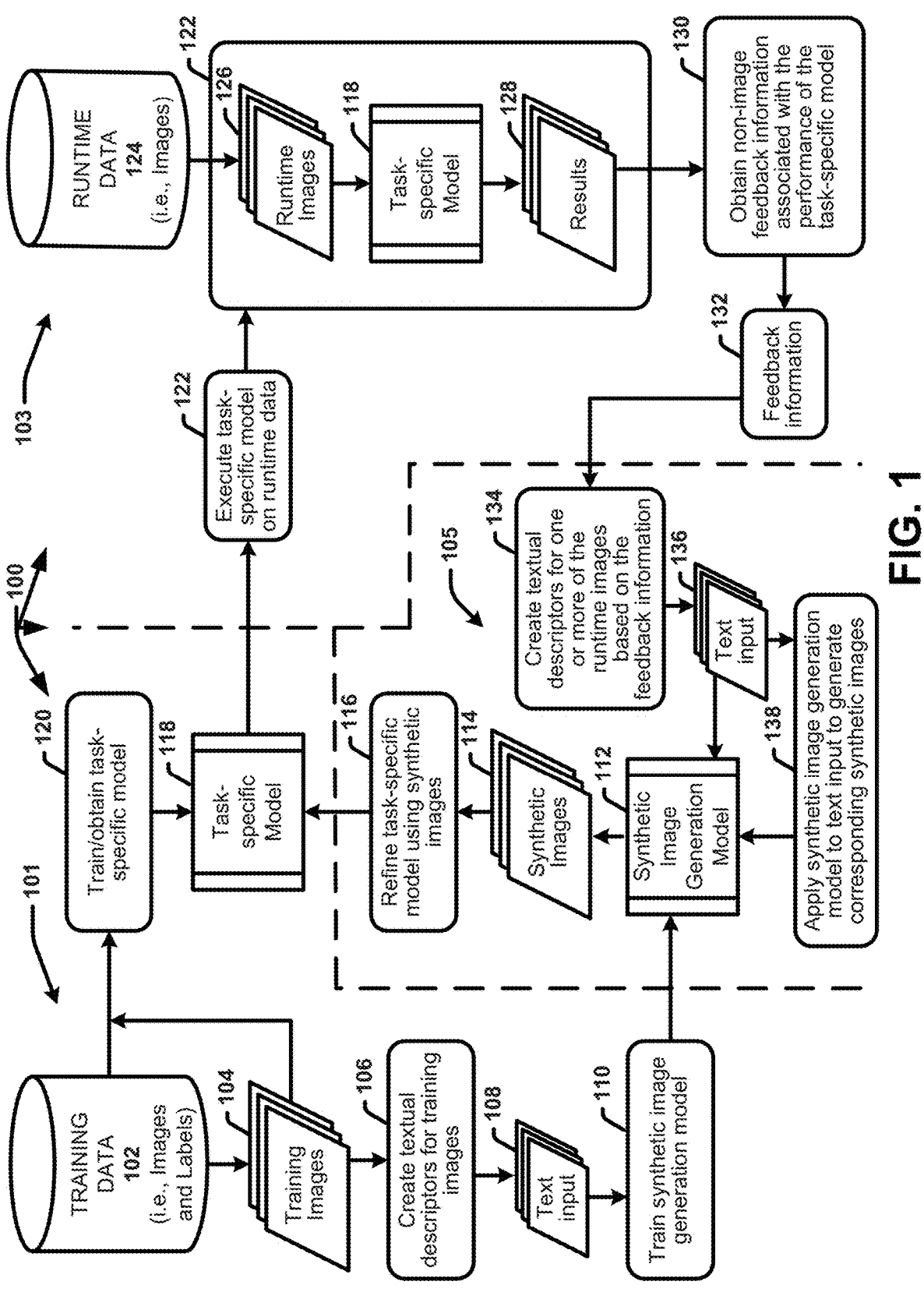
FIG. 1 presents a flow diagram of an example high-level process for refining or updating medical image inferencing models post deployment using synthetic images generated from non-image data feedback, in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section, Summary section or in the Detailed Description section.

The subject disclosure provides systems, computer-implemented methods, apparatus and/or computer program products that facilitate refining or updating image inferencing models post deployment using synthetic images generated from non-image data feedback. Various embodiments of the disclosed techniques can be employed in association with medical image inferencing models configured to perform an inferencing task on one or more medical images. However, the disclosed techniques can also be applied to other types of image inferencing models adapted to perform various inferencing tasks on other types of images aside from medical images.

As noted in the Background Section, the data-driven nature of ML models leads to challenges during the inferencing stage. In particular, one of the fundamental problems in data-driven based machine learning approaches is that the final model inferencing capability is limited by the scope of the training data used to develop the model. For example, in various domains, AIs models are often trained and developed by a particular model development entity, such as a vendor that develops ML models for usage by multiple client systems. For instance, in the healthcare domain, the vendor often includes a software development system that specializes in developing ML tools for healthcare systems, such as hospitals, medical imaging centers, and the like. In accordance with this example, the healthcare system (e.g., the hospital, the medical imaging center, etc.,) corresponds to the client system. The term "vendor", "vendor site", "vendor system" or variants thereof is used to refer to the vendor entity or system that generates, updates and provides a ML model to one or more client systems for usage thereof. The term "client", "client site", "client system," or variants thereof is generally used herein to refer to the client system that receives and employs the ML model in the field.

In accordance with the above-described vendor-client system architecture for ML model development and deployment, the scope of the vendor created model is limited by the training data used by the vendor. Depending on the nature of the model and the data being processed, it can be very difficult if not impossible for the vendor training data to be comprehensive of all the variations the model will encounter when deployed in the field. For example, a ML model trained on clinical data from one hospital may not perform as well on the same type of data from another hospital. In this regard, the vendor/model developer does not have access to every possible medical image ever taken in the world and new medical images and features will constantly evolve as the patients and acquisition technologies evolve over time. Accordingly, techniques for regularly monitoring the performance of a deployed model at a client site and updating the model to the particular nuances and variations in the data at the client site over time are crucial to the successful integration of ML models for real-world applications.

To improve these models continuously over time, it is necessary to retrain and update the models to improve their performance based on feedback regarding model errors or failure modes observed in actual deployment environments (e.g., post initial training and development). It is often not possible to understand the failure modes without obtaining the input patient imaging data processed and/or generated by the models in the deployment environment. However, obtaining the deployment site patient imaging data can be difficult as there are often contractual restrictions and privacy issues that prohibit medical image data sharing between the vendor site and the client site.

The disclosed techniques address this problem by using techniques to obtain non-image feedback from the deployment site regarding performance issues associated with an image inferencing model at the deployment site and without obtaining the input patient imaging data processed and/or generated by the models at the deployment site. For example, the non-image feedback can include text data that describes the input image or images processed by a model in which the output is associated with a performance issue (e.g., an accuracy issue, a specificity issue, a failure mode, or another measure of performance indicative of poor model performance). The non-image feedback can also include text data that describes the results or model output for which the performance issue or issues were observed. The non-image feedback can also include text data that describes or indicates the performance issue or issues (e.g., failure modes).

The non-image feedback will vary depending on the type and/or task of the image inferencing model. For example, assume the deployed model comprises a medical image optimization model configured to process an input medical image to generate an output image with improved image quality (e.g., resolution, alignment, or another quality related characteristic). In accordance with this example, assume the quality of the output image generated by the model is not improved sufficiently or as expected by the model (e.g., as determined via one or more quality assessment metrics). In this scenario, the non-image feedback may include text information identifying or indicating how the quality of the output image is insufficient, text information describing the input image, and/or text information describing the quality deficiency associated with the output image.

The disclosed techniques further employ one or more text to synthetic image generation techniques to generate synthetic images representing the deployment site input images associated with the model performance issues using the non-image feedback. The disclosed techniques further employ the synthetic images to refine or update the model continuously or regularly over time.

The term "image data," is used herein to refer to one or more images, image data structures (e.g., image files in any format), and/or video data composed of picture elements (e.g., pixels) capable of being rendered via a display as a visual data object. For example, the term image data can refer to one or more digital images, native image, synthetic images, or the like. The term image data can also refer to a portion of an image, a segmentation mask, an augmented image, a graphical image, a sinogram image, or another type of image construct comprising picture elements capable of being rendered via a display.

The term "medical image data" is used to refer to image data that depicts one or more anatomical regions of a patient. Reference to a medical image or medical image data herein can include any type of medical image associated with various types of medical image acquisition/capture modalities. For example, medical images can include (but are not limited to): radiation therapy (RT) images, X-ray (XR) images, digital radiography (DX) X-ray images, X-ray angiography (XA) images, panoramic X-ray (PX) images, computerized tomography (CT) images, mammography (MG) images (including a tomosynthesis device), a magnetic resonance imaging (MRI) images, ultrasound (US) images, color flow doppler (CD) images, position emission tomography (PET) images, single-photon emissions computed tomography (SPECT) images, nuclear medicine (NM) images, and the like. Medical images can also include synthetic versions of native medical images such as augmented, modified or enhanced versions of native medical images, augmented versions of native medical images, and the like generated using one or more image processing techniques. In this regard, the term "native" image or "real" image is used herein to refer to an image in its original capture form and/or its received form prior to processing via one or more medical image inferencing models. The term "synthetic" image is used herein to distinguish from native images or real images and refers to an image generated or derived from a native or real image using one or more synthetic processing techniques (e.g., synthetic image generation from text data). In some embodiments, the term "image data" can include the raw measurement data (or simulated measurement data) used to generate a medical image (e.g., the raw measurement data captured via the medical image acquisition process).

The term "non-image data" is used herein to refer to any type of data that excludes image data. In this regard, the term "non-image data" can include text data (e.g., a text data file in any text data type format), audio data (e.g., an audio file in any type of audio file format) or another type of data format excluding image data.

The terms "algorithm" and "model" are used herein interchangeably unless context warrants particular distinction amongst the terms. The terms "artificial intelligence (AI) model" and "machine learning (ML) model" are used herein interchangeably unless context warrants particular distinction amongst the terms. Reference to an AI or ML model herein can include any type of AI or ML model, including (but not limited to): deep learning models, neural network models, deep neural network models (DNNs), convolutional neural network models (CNNs), generative adversarial neural network models (GANs) and the like. An AI or ML model can include supervised learning models, unsupervised learning models, semi-supervised learning models, combinations thereof, and models employing other types of ML learning techniques. An AI or ML model can include a single model or a group of two or more models (e.g., an enable model or the like).

The term "image inferencing model" is used herein to refer to an AI/ML model adapted to perform an image processing or analysis task on image data. The image processing or analysis task can vary. In various embodiments, the image processing or analysis task can include, (but is not limited to): a segmentation task, an image reconstruction task, an object recognition task, a motion detection task, a video tracking task, an optical flow task, and the like. The image inferencing models described herein can include two-dimensional (2D) image processing models as well as three-dimensional (3D) image processing models. The image processing model can employ various types of AI/ML models (e.g., deep learning models, neural network models, deep neural network models, DNNs, CNNs, GANs, etc.). The terms "image inferencing model," "image processing model," "image analysis model," and the like are used herein interchangeably unless context warrants particular distinction amongst the terms.

The term "image-based inference output" is used herein to refer to the determination or prediction that an image processing model is configured to generate. For example, the image-based inference output can include a segmentation mask, a reconstructed image, an adapted image, an annotated image, a classification, a value, or the like. The image-based inference output will vary based on the type of the model and the particular task that the model is configured to perform. The image-based inference output can include a data object that can be rendered (e.g., a visual data object), stored, used as input for another processing task, or the like. The outputs can be in different formats, such as for example: a Digital Imaging and Communications in Medicine (DICOM) structured report (SR), a DICOM secondary capture, a DICOM parametric map, an image, text, and/or JavaScript Object Notation (JSON). The terms "image-based inference output", "inference output" "inference result" "inference", "output", "result," "predication", and the like, are used herein interchangeably unless context warrants particular distinction amongst the terms.

As used herein, a "medical imaging inferencing model" refers to an image inferencing model that is tailored to perform an image processing/analysis task on medical image data. For example, the medical imaging processing/analysis task can include (but is not limited to): disease/condition classification, disease region segmentation, organ segmentation, disease quantification, disease/condition staging, risk prediction, temporal analysis, anomaly detection, anatomical feature characterization, medical image reconstruction, and the like. The terms "medical image inferencing model," "medical image processing model," "medical image analysis model," and the like are used herein interchangeably unless context warrants particular distinction amongst the terms.

Embodiments of systems and devices described herein can include one or more machine-executable (i.e., computer-executable) components or instructions embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described. These computer/machine executable components or instructions (and other described herein) can be stored in memory associated with the one or more machines. The memory can further be operatively coupled to at least one processor, such that the components can be executed by the at least one processor to perform the operations described. In some embodiments, the memory can include a non-transitory machine-readable medium, comprising the executable components or instructions that, when executed by a processor, facilitate performance of operations described for the respective executable components. Examples of said and memory and processor as well as other suitable computer or computing-based elements, can be found with reference to FIG. 9 (e.g., processing unit 904 and system memory 906 respectively), and can be used in connection with implementing one or more of the systems or components shown and described in connection with FIG. 1, or other figures disclosed herein.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 presents a flow diagram of an example high-level process 100 for refining or updating medical image processing models post deployment using synthetic images generated from non-image data feedback, in accordance with one or more embodiments of the disclosed subject matter. In one or more embodiments, process 100 can be divided into sub-process 101, sub-process 103 and sub-process 105.

Sub-process 101 corresponds to a model development process wherein one or more ML/AI models are initially trained and developed. The one or more ML/AI models can include a task-specific model 118 trained to perform a specific image inferencing task on a set of training images (e.g., included in training data 102). The specific inferencing task and the type of training images can vary. In various embodiments, the training images can include medical images and the specific inferencing task can include a medical image inferencing task (e.g., organ segmentation, disease classification, image reconstruction/augmentation, etc.). In other embodiments, the training images can include any other type of images (e.g., aside from medical images) and the inferencing task can include any type of image processing or analysis task (e.g., object recognition, object classification, image optimization, etc.).

The one or more ML/AI models can also include a synthetic image generation model 112 trained to generate a synthetic image based on input data comprising only text input. Text to synthetic image generation is the creation of artificially generated images from only text input that look as realistic as real images. These images can be created by various types of neural network models trained on text-image pairs, wherein the text associated with the respective images includes textual descriptors of the respective images. For example, in some implementations, the synthetic image generation model 112 can a GAN which use a generator-discriminator architecture to train, generate and rate synthetic images using a creation-feedback loop that runs multiple times until the generated synthetic image can fool the discriminator enough to be considered a real image. In another example, the synthetic image generation model 112 can include a variational autoencoder (VAE) or a vector quantized variational autoencoders (VQ-VAE).

In another example, the synthetic image generation model 112 can include a contrastive language-image pre-training (CLIP) model. A CLIP is a type of neural network that can be trained in natural language on a variety of (image, text) pairs to make predictions based on an image about the most relevant textual description. During training, the model learns the relationship between a whole sentence and the image it describes; in a sense that when the model is trained, given an input sentence it will be able to generate the most accurate images related to the sentence. The CLIP architecture is based on zero-shot learning, where the model attempts to predict a class it saw zero times in the training data (e.g., a model trained on exclusively cats and dogs can be then used to detect rabbits). In this regard, a CLIP model is well suited for application in the disclosed context wherein the model is used to generate synthetic images corresponding to image variants observed in deployment environment that were not included or well represented in the training distribution used to train the task-specific model 118.

Sub-process 103 corresponds to a model deployment process wherein the task-specific model 118 is deployed in a deployment environment following initial training and/or updating (in accordance with sub-process 105). For example, as applied to embodiments in which the task-specific model 118 corresponds to medical image inferencing model, the deployment environment may be associated with a clinical environment such as a hospital, a medical imaging system, a medical imaging facility, or the like, wherein the deployment site employs the medical image inferencing model to generate inferences on their patient images.

Sub-process 105 corresponds to a model refinement or updating process wherein the task-specific model 118 is updated based on feedback information 132 received from the deployment site. In accordance with the disclosed techniques, the model updating process involves updating the task-specific model 118 using synthetic images (e.g., synthetic images 114) generated based only on text input (e.g., text input 136) included in and/or generated from the feedback information 132 and using the synthetic image generation model 112.

In this regard, with reference to sub-process 101, at 120 sub-process 101 can include training or obtaining the task-specific model 118. In some embodiments, the task-specific model 118 can include a previously trained/developed model. In other embodiments, sub-process 101 can involve initial training and development of the task specific model 118. In either of these embodiments, the training process can involve any existing or future developed ML training processes (e.g., supervised training, unsupervised training, semi-supervised training, etc.) which can vary depending on the type of the task-specific model 118. In either of these embodiments, the training process involves training the task-specific model to generate an image-based inference output based on a training dataset comprising a set of training images (e.g., training images 104, included in training data 102). In some embodiments, (e.g., as applied to supervised and semi-supervised ML techniques) the training images 104 can include or be associated with labels providing ground truth annotations. For example, as applied to training an organ segmentation model to segment a region of interest (ROI) in medical images, the labels may include information identifying or defining the ROI.

Additionally, or alternatively, the training images 104 can be associated with labels and/or image metadata that describes relevant attributes associated with the training images. Image metadata (or simply metadata) is used herein to refer to text information pertaining to an image file that is associated with the image file (e.g., embedded into the image file or saved to a separate file). Image metadata can include information relevant to the image itself and to its production. For example, as applied to medical images or medical image data, the medical image metadata can textual information that describes the type of medical image, the acquisition process, the acquisition parameters, the acquisition context, the anatomical region captured, the content of the medical image, and the like. The acquisition parameters/protocol information can vary depending on the modality of the medical imaging study performed. Some example acquisition parameters/protocol information may include (but is not limited to): contrast phase, imaging frequency, reconstruction kernel size, slice thickness, radiation dose, view of an XR image, MR sequence, capture resolution, voxel size, scan prescription plane, scan region, bounding box, and scan time. Image metadata may also include text information describing known visual properties of the medical images such as image quality, image resolution, signal noise, pixel spacing, imaging depth, image capture position/orientation (e.g., including the relative scan position to other scan images generated for a medical image series), relative position/dimension of anatomical landmarks, and so on. Medical image metadata may also include information describing known attributes of the patient/subject represented in the medical image (e.g., patient identifiers, patient demographic information, body mass index (BMI), medical history, pathology, etc.).

At 106, process 101 can involve creating textual descriptors for the training images 104 that can be used as text input 108 in association with training the synthetic image generation model 112 at 110. In this regard, the textual descriptors can include or correspond to textual information that describes relevant attributes of the corresponding training images 104 that can be used to train a synthetic image generation model 112 to generate synthetic versions of the training images 104. In some embodiments in which the synthetic image generation model 112 corresponds to a CLIP neural network, the text input 108 can include an aggregation of any natural and structured text information associated with the respective training images (e.g., as extracted from the image metadata and/or any other text files associated with the respective training images). Additionally, or alternatively, various natural language processing (NLP) techniques can be employed at 106 to generate structured textual descriptors for the training images 104. In general, the training process for training the synthetic image generation model 112 can involve training the model to generate a synthetic version of the respect training images 104 given the corresponding textual description of the training images as input and the training images themselves as the ground truth exemplars.

In accordance with the above-described embodiments of sub-process 101, the training images 104 used to train synthetic image generation model 112 at 110 correspond to the same training images used to initially train the task-specific model 118. In other embodiments, the training images 104 used to train the synthetic image generation model 112 at 110 may include additional or alternative images. As applied to the medical imaging domain, the training images used to train the task-specific model 118 and the synthetic image generation model 112 correspond to medical images.

With reference to sub-process 103, at 122 the task-specific model 118 is executed on runtime data (e.g., included in runtime data 124). In this regard, at 122 the task-specific model 118 can be applied in deployment environment to runtime images 126 to generate the corresponding inference output (i.e., results 128) that the task-specific model 118 has be trained to generate. For example, as applied to a medical image inferencing model, the runtime images 126 can include actual patient images (e.g., real or native patient images) associated with a clinical deployment site (e.g., a hospital, a medical imaging system, a medical imaging facility, etc.). The results 128 will vary depending on the type of the medical image inferencing model and the particular task that the model is trained to perform (e.g., organ segmentation, disease classification, disease quantification, disease localization, legion detection, image quality optimization, etc.). In this regard, in some embodiments, the results 128 may include image data, such as an organ segmentation mask, an augmented version of the input image, or another type of image data output related to the input image. Additionally, or alternatively the results 128 may include text data, such as text information describing or relating to a disease classification, a disease quantification, a diagnosis, a quality metric, a confidence score associated with the model's confidence in the output, text information describing a size, shape, location and/or another inferred characteristic about a anatomical landmark of interest, and so on.

At 130, non-image feedback information (i.e., feedback information 132) is obtained associated with the performance of the task-specific model 118. In some embodiments, the feedback information 132 can include aggregated feedback regarding all (or some) of the results 128 and the corresponding input images regardless of whether the results are attributed with positive or negative performance by the task-specific model 118. In other embodiments, the feedback information 132 can particularly pertain to the portion of the results 128 attributed to negative performance by of the task-specific model 118 (e.g., one or more errors or failure modes, a low confidence score, etc.) and the corresponding runtime input images for which those negative results were generated. For example, the feedback information 132 can include information identifying or indicating any of the results 128 that are associated with errors or otherwise indicative of poor performance by the task-specific model 118 (e.g., as determined via one or more objective and/or subjective performance assessment metrics). In this regard, in various embodiments, the disclosed techniques are particularly directed to generating synthetic versions of the portion of the runtime images 126 that that task-specific model 118 did not perform well on so in the deployment environment as to update/refine the model using exemplars of such images. With these embodiments, the feedback information 132 can include information identifying or indicating why and/or how such results are attributed to poor model performance (e.g., information identifying or indicating how the results are inaccurate and/or insufficient) and information describing relevant attributes of the runtime images that are respectively associated with the poor results. For example, as applied to medical images, the feedback information 132 may include textual information for the those runtime images for which the task-specific model 118 generated poor results, such as but not limited to: information describing relevant attributes of the runtime images (e.g., image content, scanning parameters used, artifacts observed, pathologies observed, present/absence of anatomical structures), and information describing potential sources of error (e.g., failure modes) of the task-specific model 118.

The feedback information 132 can be obtained in various manners. For example, the feedback information 132 can be obtained in an automated manner via extraction of relevant image metadata and/or clinical report data (e.g., radiology reports regarding findings, legion characterization, measurements of pathological regions, etc.) associated with the runtime images. The metadata and/or the clinical report data may be associated with the runtime images in runtime data 124 or in another accessible data storage structure (e.g., a network accessible database or datastore, local memory associated with a computing device providing the runtime images, etc.). The feedback information 132 may also be obtained in an automated manner via automated assessment of the results 128 and/or the runtime input images 126 via one or more AI models (e.g., confidence scoring models, image quality assessment models, result accuracy/specific assessment models, image feature extraction models, etc.). The feedback information 132 can also include user provided feedback received in association with reviewing the results 128 and/or the corresponding runtime input images 126. In some implementations, the user provided feedback may be obtained in a semi-automated manner via utilization of one or more feedback reporting tools that facilitate collecting user input in association with reviewing the results 128 and/or the runtime images 126. For example, in some embodiments as applied to medical imaging, sub-process 103 may be facilitated in association with utilization of a medical imaging application at the deployment site that facilitates viewing the runtime input images 126 and the results 128 and collecting relevant user feedback (e.g., in a structured format and/or in a natural language format).

Regardless of the manner in which the feedback is obtained at 130, the feedback information 132 excludes the runtime images 126. In embodiments in which the results 128 include image data (e.g., an enhanced version of the input image, an augmented version of the input image, a portion of the input image, a segmentation mask applied to the input image, an object or feature extracted from the input image, etc.), the feedback information 132 can further exclude the results. In this regard, in various embodiments, the feedback information 132 can include only non-image data (e.g., text data, audio data, or another data format excluding image data).

FIG. 2 presents a table (Table 200) summarizing some examples of non-image feedback (e.g., feedback 132) that can be obtained in accordance with sub-process 103 in accordance with one or more embodiments in which the task-specific model 118 comprises a medical image inferencing model and wherein the runtime images 126 include medical images. In accordance with these embodiments, the non-image feedback can include (but is not limited to), AI generated feedback, metadata, clinical report data and user provided feedback.

Wither reference to FIGS. 1 and 2, the AI generated feedback can include automated assessment data regarding an assessment of the results 128 and/or the corresponding runtime images 126, the automated assessment data generated using one or more AI assessment models. For example, the one more AI assessment models can include one or more AI models (e.g., medical image inferencing models) configured to generate one or more image quality parameters (e.g., in the form of text data) regarding the quality of an input image and/or the output image (in embodiments in which the results 128 include an output image). The one or more AI models can also include one or more AI models (e.g., medical image inferencing models) configured to generate textual description data regarding anatomical feature localization, detected pathologies, and/or detected artifacts in the input images and/or the output images. The one or more AI assessment models can also include one or more AI models (e.g., medical image inferencing models) configured to generate textual description data regarding the content (e.g., anatomical landmarks or features) and/or the style (e.g., contrast verses non-contrast) of the input and/or output images. Various other types of AI generated feedback are envisioned.

In some embodiments, the task-specific model 118 can include a multi-task model configured to generate a plurality of different inference outputs including a primary inference output and one or more secondary inference outputs that correspond to the AI generated feedback. With these embodiments, the one or more AI assessment models and the task-specific model 118 can be incorporated into a single unified multi-task model (e.g., an ensemble model, a stacked model or the like). In other embodiments, the one or more AI assessment models can include one or more separate models that may be separately applied to the runtime images 126 and/or the results 128 to generate corresponding feedback.

In this regard, in some embodiments, the one or more AI assessment models can be applied to the input and/or output images to generate the corresponding AI generated feedback information in association with execution of the task-specific model 118 at 122. Additionally, or alternatively, the one or more AI assessment models can be applied to the input images and/or the results in response in response to identification of the input image being associated with a output (i.e., the results 128) of the task-specific model 118 having an error or deficiency. For example, in implementations in which the one or more AI assessment models include one or more separate models from the task-specific model 118, the one or more AI assessment models can be selectively applied to generate the corresponding feedback information for only those cases in which the results poor, thus optimizing utilization of computing resources (e.g., processing and compute resources associated with running and executing the AI assessment models). For example, in some embodiments, the task-specific model 118 and/or a separate confidence assessment model (e.g., included in the AI assessment models) can be configured to generate a confidence score or another valuation measure that reflects the level of accuracy or confidence in the results 128 respectively generated by the task-specific model 118. In some implementations of these embodiments, one or more additional AI assessment models can be applied to the corresponding runtime images and/or result data to generate the corresponding AI generated feedback in response in response to the confidence score or the other valuation measure failing to satisfy defined confidence score and/or valuation measure criterion (e.g., the confidence score being below a defined threshold or the like).

FIGS. 3A-3D present additional examples of automated AI assessment data that can be obtained via various types of AI assessment models regarding an assessment of the input images and/or the results of a medical image inferencing model. With reference to FIGS. 1-3D, in accordance with the examples illustrated in FIGS. 3A-3D, the task-specific model 118 corresponds an organ segmentation model configured to segment the cardiac chambers in input medical images (e.g., the runtime images 126) corresponding to an ultrasound image (or image set/series) of the thoracic cavity. In this regard, organ segmentation model is adapted to perform a primary inferencing task wherein the output of the primary inferencing task comprises segmentation information indicating the relative geometries of the cardiac chambers (e.g., relative to the input image and/or one or more other anatomical landmarks depicted in the input images). The segmentation information may include a segmentation mask that may be overlayed onto the input image(s) and/or embedded within the input image(s). The segmentation information may additionally or alternatively include text data that defines the relative geometries of the cardiac chambers.

In some implementations, the organ segmentation model can also be adapted to generate one or more secondary outputs providing feedback (i.e., AI generated feedback) regarding an assessment of the input image(s) and/or an assessment of the performance of primary inferencing task (e.g., a confidence evaluation, a assessment of the segmentation results, etc.). Additionally, or alternatively, the one or more secondary outputs (i.e., AI generated feedback) may be generated by separate AI assessment models which can be applied to the input image(s) and/or the results. FIGS. 3A-3D provides example types of AI generated feedback A-G which may be generated as secondary tasks (e.g., secondary outputs) of the segmentation model or by one or more separate AI assessment models.

With reference to FIG. 3A, in this example, the AI generated feedback A provides information describing or indicating the relative size of the thorax in the input image(s). For instance, the AI generated feedback A may be generated by a thorax localizer model (e.g., integrated with the organ segmentation model or a separate model) that generates information indicating the size of the thorax relative to the field of view (FOV) and/or information indicating whether the magnification level of the thorax satisfies defined acceptable criteria (e.g., being 60-80% of the FOV). AI generated feedback A corresponds to a type of quality metric that assess whether the magnification level of the thorax in the input image(s) satisfies acceptable criteria for processing by the organ segmentation model in association with generating accurate results.

In FIG. 3B, the AI generated feedback B corresponds to a confidence score that represents a measure of confidence in the organ segmentation model in association with generating an accurate output on the input image(s). Example AI generated feedback C provides an automated assessment of one or more anatomical landmarks depicted in the input image(s). Both of these types of secondary outputs can also correspond to type of quality metric that reflect a measure of quality of the input images and can be used to assess whether the input images satisfy one or more defined quality measures (or another criteria) for generating a quality output (e.g., with respect to accuracy, specific or another quality valuation) by the organ segmentation model (e.g., whether the input images have defined anatomical features present, whether the input image(s) depict specific views, whether the model has sufficient confident on the input image(s), etc.).

In FIG. 3C presents an example of the type of automated feedback (e.g., example AI feedback D, E and F) that can be generated by a quality regressor model regarding an automated assessment of the input image(s). In this example, the quality regressor model corresponds to an AI model adapted to generate information regarding generic image quality, such information describing artifacts (e.g., presence and/or absence thereof, artifact type, artifact size/location, etc.), image content, image FOV, and an overall quality score (e.g., on a scale of 0-1). The quality regressor model may correspond to a separate model from the segmentation model or integrated with the segmentation model (e.g., as secondary tasks of the segmentation model).

FIG. 3D presents an example of the type of automated feedback (e.g., example feedback G) that can be generated by another type of quality regressor model. In this example, the quality regressor model corresponds to an AI model adapted to generate information regarding the task-specific image quality. In this regard, the task-specific image quality refers to a tailored quality assessment of the input image data that is of particular reliance to the task-specific model 118 under assessment. In this example, the task-specific image quality information includes a quality score that measures the quality of the heart axis view and provides information regarding specific relevant anatomical characteristics of the input image data (e.g., values closed and mid-way ventricle and atria).

With reference back to FIG. 2 (in view of FIG. 1), the metadata can include textual descriptors associated with the input image data (e.g., runtime images 126) that describes acquisition parameters (e.g., frequency, depth, gain, etc.), and other relevant information about the type of image data, the content of the image data, the patient, the acquisition process and other clinical and non-clinical information (e.g., pediatric, scanning depth, depth of the object, etc.). The non-image feedback can also include textual information extracted from clinical reports associated with the input image data. Some examples of the type of non-image data that may be extracted from clinical reports associated with the respective runtime images 126 can include pathology information, measurements of pathological regions, characterization of nodules (e.g., echogenicity), and description of other adjoining anatomies.

The non-image feedback can also include user provided feedback. Some examples of user provided feedback can include feedback providing a valuation of the accuracy of the result of the task-specific model 118 (e.g., a binary value and/or another non-binary measure). In some implementations, the user provided feedback can also relate to accuracy of the any secondary outputs generated by the task-specific model 118 and/or separate AI assessment models (e.g., accuracy of the information described in Example AI generated feedback A-G for instance). Another example, of user provided feedback can include information providing an indication of one or more predefined model failure modes which may be selected via a drop-down menu provided by a feedback tool associated with a medical imaging application that facilitates reviewing the task-specific model results in association with reviewing the input image data, as illustrated in FIG. 4.

Figure 4:
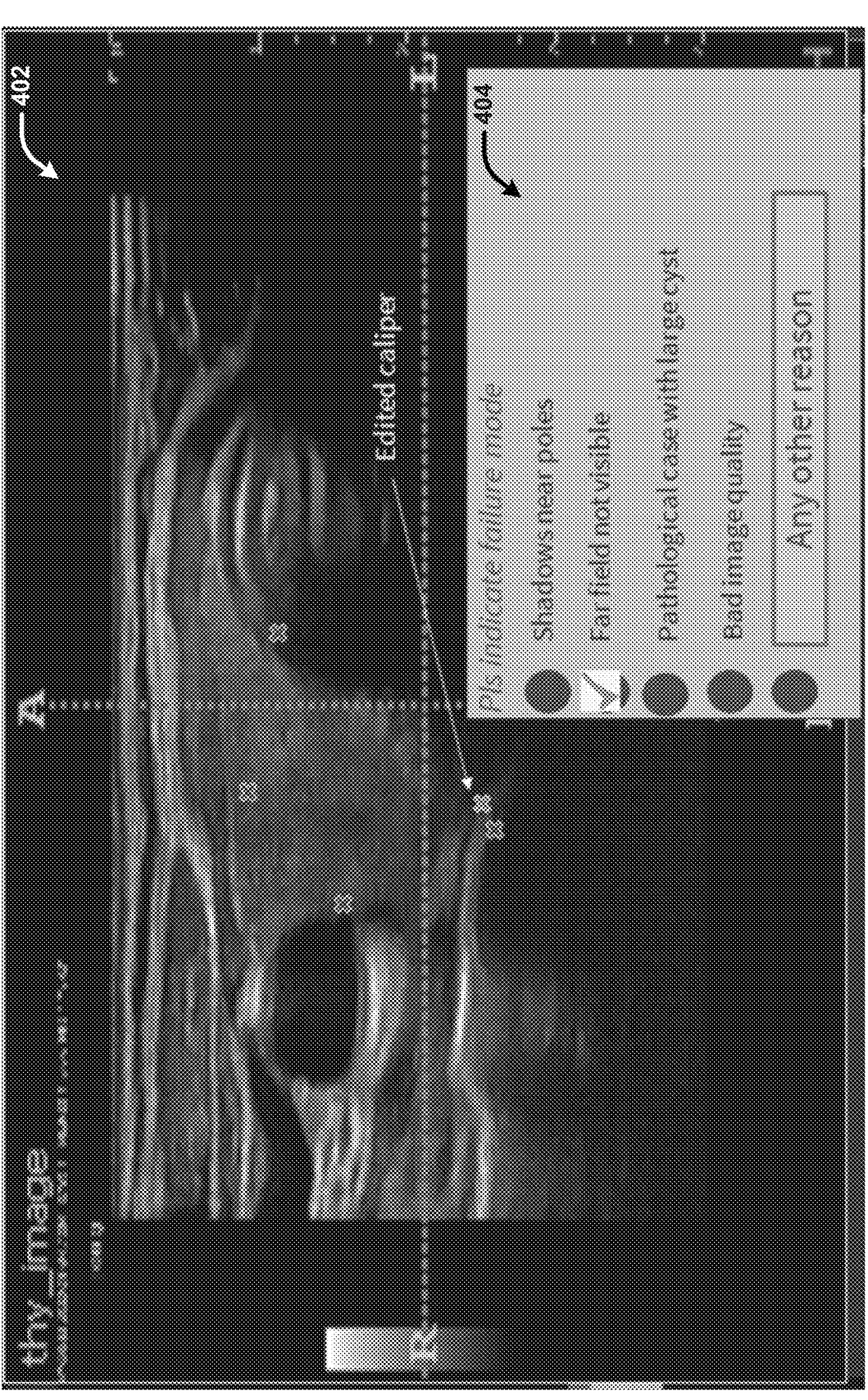
FIG. 4 presents an example feedback tool associated with a medical imaging application that facilitates receiving user feedback regarding failure information associated with a medical image inferencing model in accordance with one or more embodiments of the disclosed subject matter.

In this regard, FIG. 4 presents an example feedback tool associated with a medical imaging application that facilitates receiving user feedback regarding failure information associated with a medical image inferencing model in accordance with one or more embodiments of the disclosed subject matter. In this example, the feedback tool provides an interactive feedback menu 404 that can be accessed via the medical imaging application in association with reviewing the medical image data processed and/or generated by the task-specific model 118 in a primary viewing area 404. The interactive feedback menu 404 provides a selectable list of predefined failure modes that may be associated with the task-specific model 118 (e.g., four predefined failure modes, of which the "far field not visible" option is selected in this example) and selected by a reviewer to provide feedback indicating the potential failure mode. The interactive feedback menu 404 also provides an option to provide natural language feedback (e.g., free-text input) indicating any other reason the user may consider the source of error in the task-specific model output. It should be appreciated that the example user feedback regarding failure modes illustrated in FIG. 4 are merely one example of the type of user feedback that may be included in the feedback information 132 and that the user feedback can include various other types of textual descriptive (or voice to text input) describing attributes of input images for which the output of the task-specific model 118 was inaccurate.

With reference back to FIG. 1 and sub-process 105, at 134, textual descriptors (e.g., text input 136) for one or more of the runtime images 126 (e.g., one or more of the runtime images associated with errors/failures in the task-specific model in the deployment environment) can be generated based on the feedback information 132 and the textual descriptors (e.g., text input data 136). For example, in some embodiments, the process of creating the textual descriptors can involve converting the feedback information 132 (e.g., non-image feedback) into a structured format for processing by the synthetic image generation model 112. With these embodiments, the process of creating the textual descriptors at 134 may correspond to the same or a similar process used to create the textual descriptors at 106. In other embodiments, the feedback information 132 may be received in an appropriate format compatible for direct input into the synthetic image generation model 112. With these embodiments, step 134 may be omitted and the text input 136 can correspond to the feedback information 132. At 138, the synthetic image generation model is applied to the text input 136 (or the feedback information 132) to generate corresponding synthetic images 114. In various embodiment, the synthetic images 114 generated by the synthetic image generation model 112 based on the text input 136 (or the feedback information 132) correspond to synthetic versions of respective images of the runtime images 126 attributed to errors or failures (or another valuation of poor model performance) in the task-specific model 118 observed the runtime environment.

Figure 5:
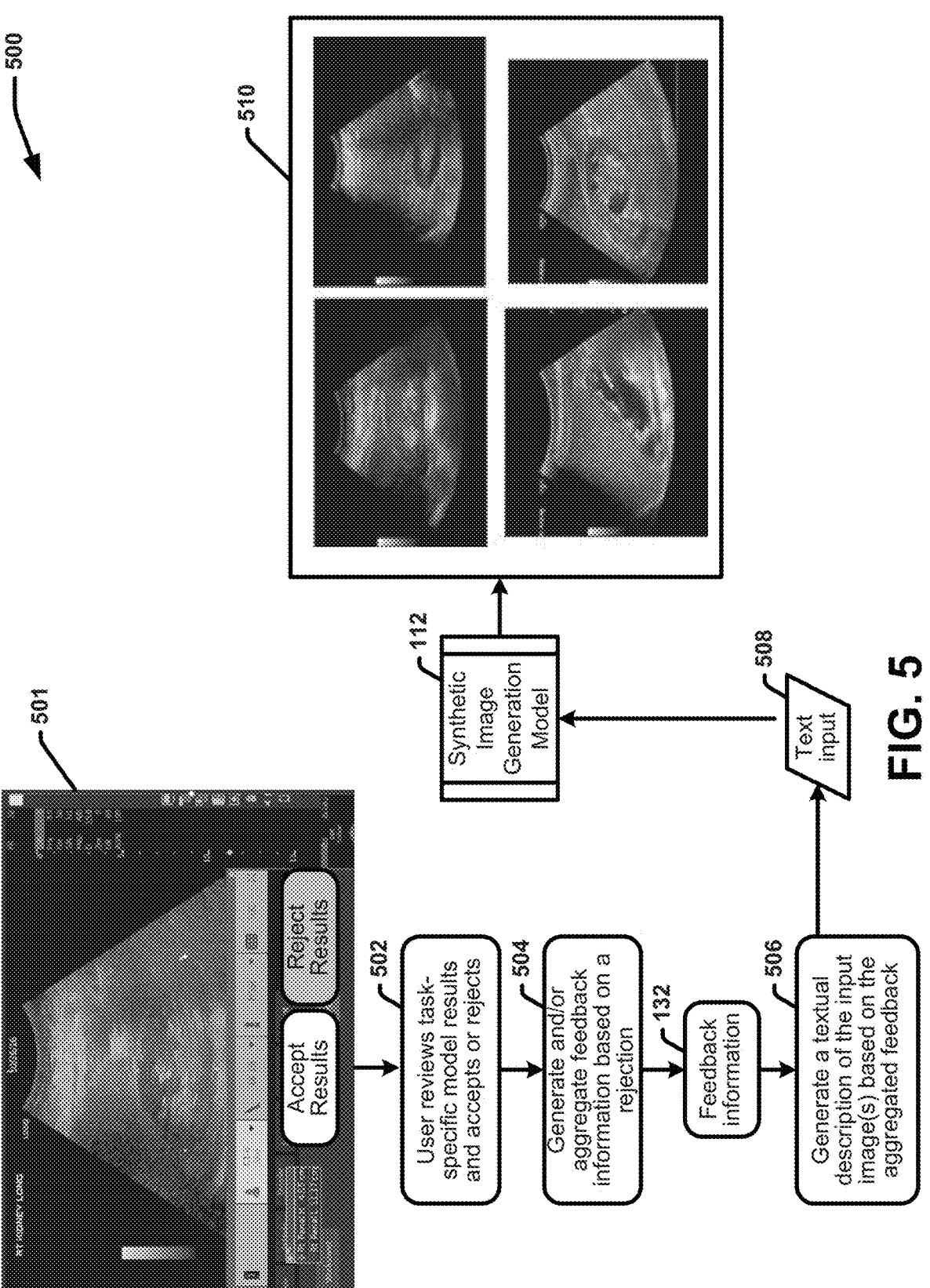
FIG. 5 illustrates an example process for generating synthetic medical images using textual feedback in accordance with one or more embodiments of the disclosed subject matter.

FIG. 5 illustrates an example process 500 for generating synthetic medical images using textual feedback in accordance with one or more embodiments of the disclosed subject matter. With reference to FIGS. 1 and 5, process 500 is exemplified in association with utilization of a medical imaging application to view the results of the task-specific model via an interactive visualization user interface 501. Repetitive description of like elements employed in respective embodiments is omitted for sake of brevity. In this example, the UI 501 provides buttons corresponding to "accept results" and "reject results" that can respectively be selected by an entity reviewing the results and/or the input image data processed by the task-specific model 118 to generate the result. A selection accepting the results should be applied based on the reviewer considering the results accurate and/or sufficient, and a selection rejecting the results should be applied based on the reviewer considering the results inaccurate and/or insufficient (e.g., based on defined and/or subjective/objective criteria).

In accordance with process 500, at 502, a user can review the task-specific model results and provide input via the UI 501 selecting or accepting the results. At 504, feedback information 132 can be generated and/or aggregated (e.g., extracted from metadata, medical reports, additional user feedback received via the medical imaging application, AI generated feedback, etc.) based on a rejection. At 506, a textual description (e.g., text input 508) of the native input image or images for which the poor results are based can be generated (or in other implementation the feedback information 132 can be directly processed by the synthetic image generation model 112). The textual description (e.g., text input 508) of the native input image or images is applied as input to the synthetic image generation model 112 to generate one or more synthetic images 510 as output, the one or more synthetic images corresponding to synthetic versions of the one or more native input images.

The techniques for implementing process 500 can vary. For example, in some embodiments, all of the feedback information 132 generated and/or received for a particular input image or input image set and the corresponding results of the medical image inferencing model may be aggregated and stored in a log file (e.g., a text file) that may be associated with a storage system associated with the deployment site and/or the entity performing the synthetic image generation. In other implementations, the deployment site may be configured to send the log file to the entity performing the synthetic image generation in response to creation thereof. Various implementation scenarios are envisioned.

With reference again to FIG. 1 sub-process 105, at 116, the task-specific model 118 is refined (e.g., updated/retrained) using the synthetic images 114 (corresponding to synthetic images 510, and vice versa) to generate an updated version of the task specific model 118 with improved performance on the types of images corresponding to the synthetic images 114 relative to the previous version of the model. The process for refining/updating the task-specific model can include one or more conventional machine learning model updating processes. Typically, model updating involves re-training the task-specific model 114 and tuning one or more parameters and/or weights of the model based on processing the new training data (i.e., the synthetic images 114).

In various embodiments, sub-process 103 and sub-process 105 correspond to continuous processes that are continuously (or regularly) performed over time, and sub-process 101 corresponds to a process that may be performed once initially to train and/or obtain the task-specific mode 118 and the synthetic image generation model 112. In this regard, the deployment site can regularly and/or continuously provide feedback information 132 that can be used to update the task-specific model 118 based on how the task-specific model 118 is underperforming in the deployment environment, and the vendor site can regularly and/or continuously employ the feedback information 132 to update and refine the task-specific model 118. The vendor site can further provide the client site (i.e., the deployment site) with updated versions of the task-specific model 118 over time. In this regard, it should be appreciated that over time and following the deployment of the initially trained version of the task-specific model 118, the version of the task-specific model 118 applied at the client site in accordance with sub-process 103 can include the latest updated version generated by the vendor site.

In this regard, reference to the vendor site herein generally refers to the entity that performs the model development and updating processes (e.g., sub-process 101 and sub-process 105) and reference to the client site or deployment site refers to the entity that deploys (e.g., utilizes/executes) the task-specific model 118 following training and/or updating. In various implementations, the vendor site entity and the client site entity may be different entities. In addition, the client site entity may correspond to a plurality of different entities (e.g., different clients, such as different clinical systems as applied to healthcare domains). In other implementations, the vendor site entity and the client site entity may correspond to the same entity.

The operating environment of process 100 and/or sub-process 101, sub-process 103 and sub-process 105 can vary. In this regard, it should be appreciated that process 100 corresponds to a computer-implemented process that can be performed by one or more computing systems comprising one or more computing devices, machines, virtual machines, computer-executable components, datastores, and the like that may communicatively coupled to one another either directly or via one or more wired or wireless communication frameworks. In various embodiments, the one or more computing systems can include a vendor computing system that can performs sub-process 101 and sub-process 105, and one or more client computing systems that perform sub-process 103. With these embodiments, the vendor computing system and the client computing system may employ a cloud-based computing architecture, a server-client type architecture or the like, examples of which are described with reference to FIG. 10.

Figure 6:
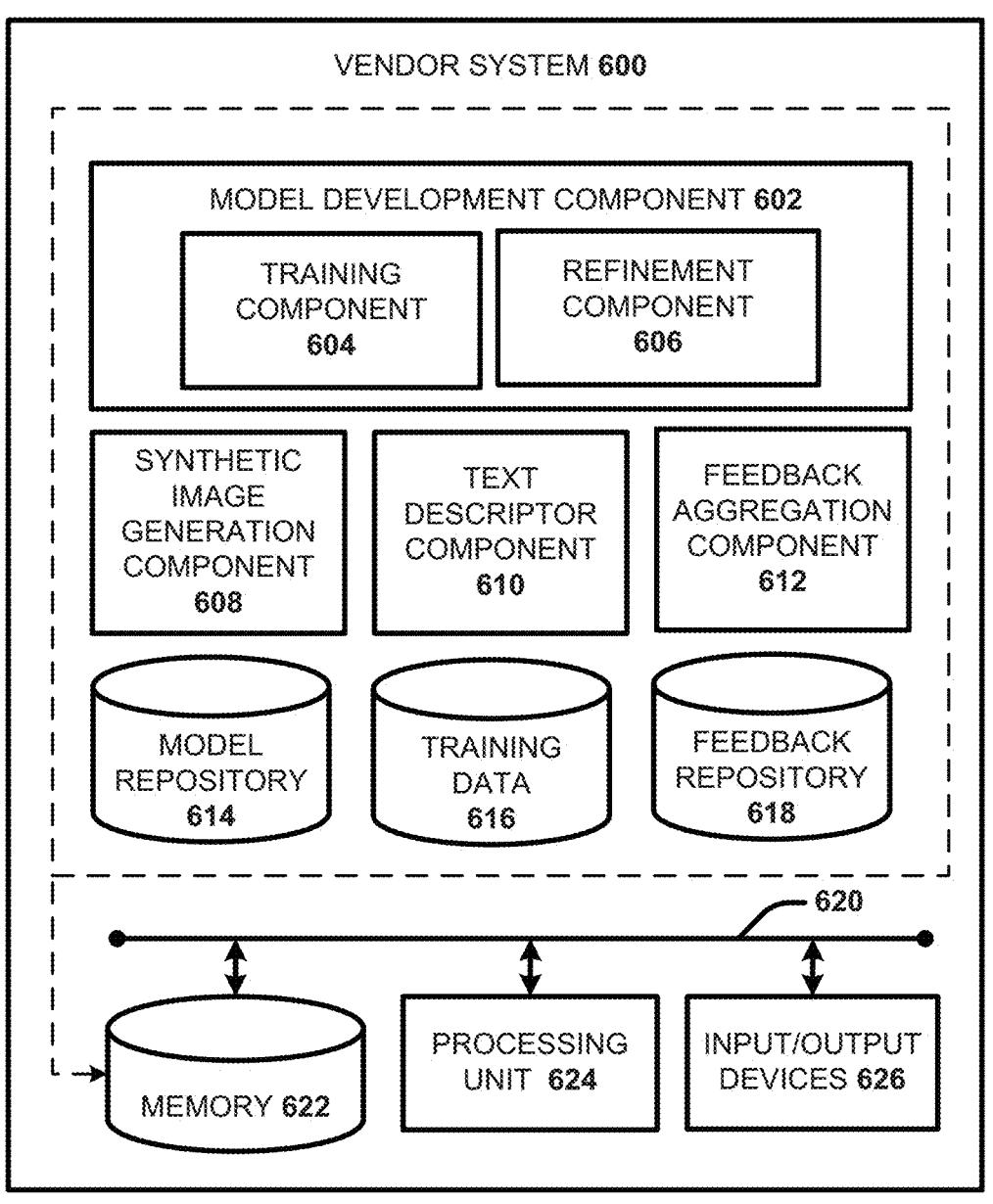
FIG. 6 illustrates an example, non-limiting computing system that may be associated with a vendor site that facilitates refining or updating medical image inferencing models post deployment using synthetic images generated from non-image data feedback, in accordance with one or more embodiments of the disclosed subject matter.
Figure 7:
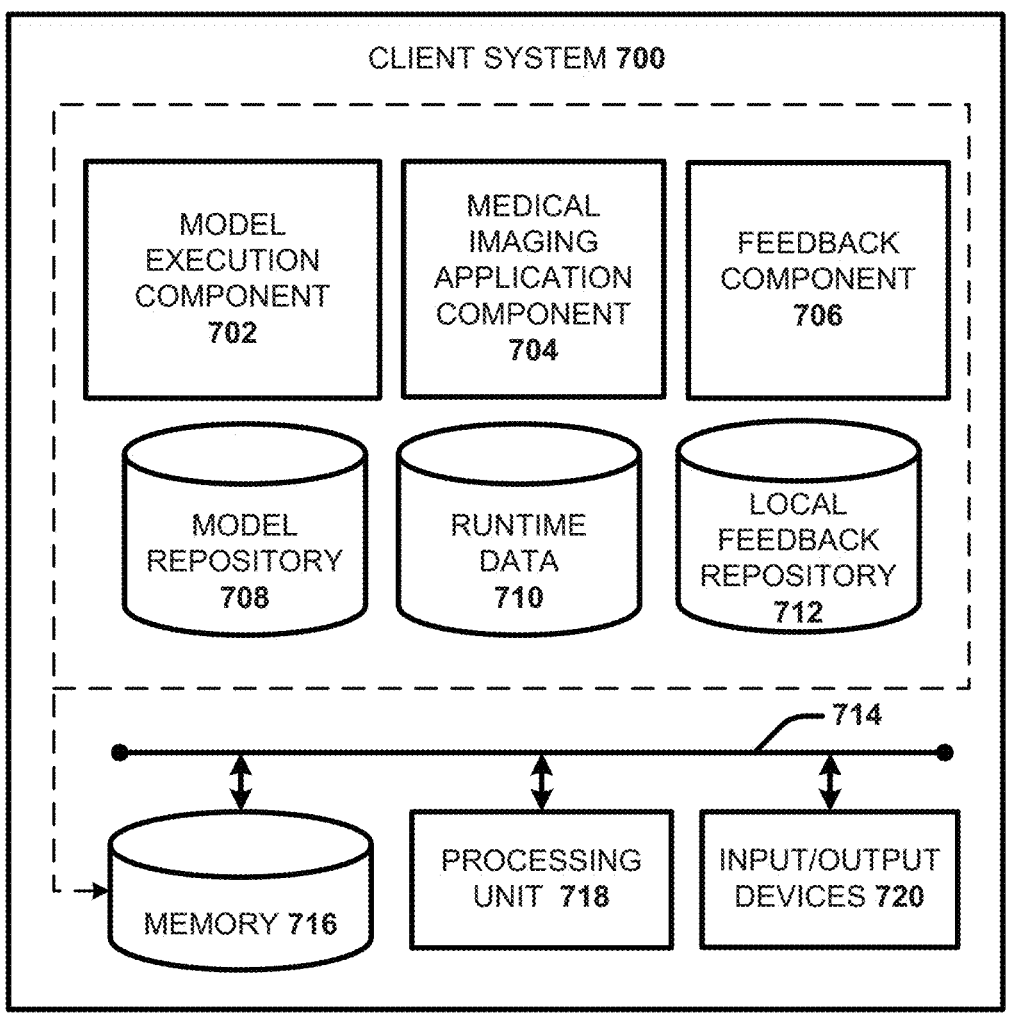
FIG. 7 illustrates an example, non-limiting computing system that may be associated with a client site that facilitates refining or updating medical image inferencing models post deployment using synthetic images generated from non-image data feedback, in accordance with one or more embodiments of the disclosed subject matter.

FIG. 6 illustrates an example, non-limiting vendor system 600 that may be associated with a vendor site that facilitates refining or updating medical image inferencing models post deployment using synthetic images generated from non-image data feedback, in accordance with one or more embodiments of the disclosed subject matter. FIG. 7 illustrates an example, non-limiting client system 700 that may be associated with a client site that facilitates refining or updating medical image inferencing models post deployment using synthetic images generated from non-image data feedback, in accordance with one or more embodiments of the disclosed subject matter. In one or more example embodiments, vendor system 600 corresponds to a computing system that performs sub-process 101 and/or sub-process 103 and client system 700 corresponds to another computing system that performs sub-process 105. The vendors system 600 and the client system 700 can respectively include or corresponds to one or more computing devices comprising suitable hardware and software that facilitates performance of the respective operations of processes 101, 103 and 105.

In this regard, with reference to FIGS. 1 and 6, in one or more embodiments, the vendor system 600 can include (or be operatively coupled to) at least one memory 622 that stores computer-executable components and at least one processor (e.g., processing unit 624) that executes the computer-executable components stored in the at least one memory 622. Examples of said and memory 622 and processing unit 624 as well as other suitable computer or computing-based elements, can be found with reference to FIG. 9, and can be used in connection with implementing one or more of the systems or components shown and described in connection with FIG. 6 or other figures disclosed herein. The computer-executable components can include (but are not limited to) model development component 602, training component 604, refinement component 606, synthetic image generation component 608, text descriptor component 612 and feedback aggregation component 612.

Memory 622 can further include (e.g., store) a model repository 614, training data 616 and a feedback repository 618. Additionally, or alternatively, the model repository 614, the training data 616, and/or the feedback repository 618 may be associated with one or more additional information storage structures (e.g., transitory memory devices, non-transitory memory devices, or the like), that may be coupled to the vendor system 600 either directly or via one or more wired or wireless communication networks. The model repository can include the various models (e.g., ML/AI models and/or other types of models or algorithms) employed by the vendor system in association with performing process sub-process 101 and sub-process 105. For example, the model repository 614 can include pre-trained and trained versions of the synthetic image generation model 112 and the task-specific model 118. In implementations in which the task-specific model 118 may be associated with one or more additional AI assessment models adapted to generate secondary outputs providing AI assessment feedback, the model repository 614 can also include the one or more additional AI assessment models. In some embodiments, training data 616 can correspond to training data 102. Additionally, or alternatively, training data 616 can the synthetic images 114 generated by the synthetic image generation model 112 using the text input 136, which correspond to additional training images that are used by the refinement component 606 in association with updating/refining the task-specific model 118 at 116 of sub-process 105. The feedback repository 618 can include the feedback information 132 and/or the text input 136 generated from the feedback information 132 (e.g., by text descriptor component 610). In this regard, the feedback repository 618 can correspond to a database that aggregates and stores non-image feedback information 132 and/or text input 136 generated therefrom as aggregated over time from one or more employment environments for one or more task-specific models.

The vendor system 600 can further include one or more input/output devices 626 to facilitate receiving user input in association with training the synthetic image generation model 112 and/or the task-specific model 118 and refining or updating the task-specific model 118. In this regard, any information received by, generated by and/or accessible to the vendor system 600 (e.g., training data 102, text input 108, feedback information 132, text input 136, synthetic images 114, etc.) can be presented or rendered to a user via a suitable output device, such as a display, a speaker or the like, depending on the data format. Suitable examples of the input/output devices 626 are described with reference to FIG. 9 (e.g., input devices 928 and output device 936). The vendor system 600 can further include a system bus 620 that couples the memory 622, the processing unit 624 and the input/output device 626 to one another.

The model development component 102 can facilitate training, developing, and updating the synthetic image generation model 112 and the task-specific model 118 in accordance with sub-process 101 and sub-process 105. For example, the model development component 602 can include training component 604 and refinement component 606. In some embodiments, the training component 604 can perform the initial model training and development of the synthetic image generation model 112 and/or the task-specific model 118 (e.g., step 110 of sub-process 101 and/or step 120 of sub-process 101 in implementations in which the task-specific model is not previously trained/developed). As described above with reference to FIG. 1, the training process can vary depending on the types of the respective models and include supervised, semi-supervised and/or unsupervised machine learning training processes.

The refinement component 606 can refine or update the task-specific model (e.g., step 116 of sub-process 105) using the synthetic images 114 and model updating process. The model updating process can correspond to the training process yet utilizing the synthetic images 114 as new training data input. For example, the model updating process can include one or more conventional machine learning model updating processes that involves tuning one or more parameter and/or weights of the task-specific model 118 based on processing of the synthetic images 114. In some embodiments, the refinement 606 can selectively control the specific synthetic images that are generated and utilized to update and refine the task-specific model 112. In this regard, in some embodiments, the feedback information 132 can encompass all feedback information received/aggregated for the task-specific model 118 over time from a deployment site, including information pertaining to both positive and negative results. In some implementations of these embodiments, the refinement component 606 can evaluate the feedback information (e.g., as included in feedback repository 618) and filter the feedback information to identify and select a subset of the feedback information associated with results and corresponding input images of the runtime images 126 associated with one or more negative performance criteria. For example, the negative performance criteria can be predefined for the task-specific model and relate to one or more attributes of the input images (e.g., content, quality, image acquisition characteristics, model confidence score, etc.). The negative performance criteria can additionally or alternatively relate to output of the task-specific model 118, such as but not limited to, information indicating or identifying one or more errors in the output, one or more indicated failure modes, or the like. With these embodiments, the refinement component 606 606 direct the synthetic image generation component 608 to generate synthetic images 114 corresponding to the subset of the runtime images for which the performance of the task-specific model 118 is associated with one or more defined negative performance criteria.

The synthetic image generation component 608 can perform the synthetic image generation process (step 138) of sub-process 105. In this regard, the synthetic image generation component 608 can apply the apply synthetic image generation model 112 to text input 136 (or the feedback information 132 directly in some embodiments) to generate the corresponding synthetic images 114. In some embodiments, the text descriptor component 610 can generate the text input (e.g., text input 108 and/or text input 136) in accordance with step 106 and/or step 134 of processes 101 and 105 respectively.

The feedback aggregation component 612 can facilitate collecting, extracting and/or receiving the non-feedback information 132 from the deployment site and aggregating the feedback in the feedback repository 618. For example, in some embodiments, the feedback information 132 generated at the deployment site may be stored in log files in one or more local data storage structures (e.g., local feedback repository 124) associated with the deployment site and the feedback aggregation component 612 can regularly or continuously access and retrieve the log files and aggregate them in the feedback repository.

With reference to FIGS. 1 and 7, in one or more embodiments, the client system 700 can include (or be operatively coupled to) at least one memory 716 that stores computer-executable components and at least one processor (e.g., processing unit 718) that executes the computer-executable components stored in the at least one memory 716. Examples of said and memory 716 and processing unit 718 as well as other suitable computer or computing-based elements, can be found with reference to FIG. 9, and can be used in connection with implementing one or more of the systems or components shown and described in connection with FIG. 7 or other figures disclosed herein. The computer-executable components can include (but are not limited to) model execution component 702, medical imaging application component 704 and feedback component 706.

Memory 716 can further include (e.g., store) a model repository 708, runtime data 710 and a local feedback repository 712. Additionally, or alternatively, the model repository 708, the runtime data 710, and/or the local feedback repository 712 may be associated with one or more additional information storage structures (e.g., transitory memory devices, non-transitory memory devices, or the like), that may be coupled to the client system 700 either directly or via one or more wired or wireless communication networks. The model repository 708 can include the task-specific model 118 (or models) employed by the client system 700 in association with performing sub-process 103. For example, the model repository 708 can one or more trained and/or updated versions of the task-specific model 118. In implementations in which the task-specific model 118 may be associated with one or more additional AI assessment models adapted to generate secondary outputs providing AI assessment feedback (e.g., the types of AI assessment feedback described with reference to FIGS. 3A-3D or the like), the model repository 708 can also include the one or more additional AI assessment models. The runtime data 710 can correspond to runtime data 124 and/or the runtime images 126. The local feedback repository 712 can correspond to a local version of the feedback repository 712 associated with the client system 700. For example, the local feedback repository can store feedback information 132 generated/received be the client device in (e.g., local log files) in association with deployment of the task-specific model in accordance with sub-process 103.

The client system 700 can further include one or more input/output devices 720 to rending information (e.g., runtime images 126 and results 128) to a user and to facilitate receiving user input in association with executing the task-specific model 118 and generating/obtaining feedback information 132 in accordance with sub-process 132. Suitable examples of the input/output devices 720 are described with reference to FIG. 9 (e.g., input devices 928 and output device 936). The client system 700 can further include a system bus 714 that couples the memory 716, the processing unit 718 and the input/output devices 720 to one another.

The model execution component 702 can execute the task-specific model and/or the one or more additional AI assessment models (e.g., where applicable) to the runtime images 126 in accordance with step 122 of sub-process 103. The feedback component 706 can facilitate obtaining the non-image feedback information (e.g., feedback information 132) associated with the performance of the task-specific model in accordance with step 130 of sub-process 103. For example, in some embodiments, for each instance of execution of the task-specific model 118, the feedback component

706 can extract metadata and/or clinical report data associated with the runtime images and any automated AI assessment information generated in association with application of the task-specific model to the runtime images and store aggregated text information in a log file associated with the execution instance. The feedback component 706 can also collect and associated any received user provided feedback for the execution instance in the log file. In some embodiments, the feedback component 706 can be configured to only generate log files for execution instances associated with one or more predefined negative performance criteria (e.g, which can encompass criteria related to the input images and/or the results of the model).

As applied to the medical imaging domain, in one or more embodiments, the client system 700 can include or otherwise have access to (e.g., as a software as a service (SaaS) model or the like) a medical imaging application component 704 that facilitates reviewing medical images, applying the task-specific model (and optionally one or more additional AI assessment models) to the runtime images, reviewing the results, and receiving user feedback (e.g., such as the user feedback described with reference to FIG. 2, FIG. 4 and other types of user provided feedback. With these embodiments, the feedback component 706 can that facilitate receiving the user provided feedback using one or more feedback tools associated with a medical imaging application component 704 in association with reviewing the results using the medical imaging application supported by the medical imaging application component 704.

FIG. 8 illustrates a block diagram of an example, non-limiting computer implemented method 800 for refining or updating medical image inferencing models post deployment using synthetic images generated from non-image data feedback, in accordance with one or more embodiments of the disclosed subject matter. Repetitive description of like elements employed in respective embodiments is omitted for sake of brevity.

At 802, method 800 comprises generating, by a system comprising a processor (e.g., vendor system 600 or the like) synthetic medical images based on feedback information regarding performance of a medical image inferencing model received in association with application of the medical image inferencing model to medical images in a deployment environment, wherein the feedback information excludes image data (e.g., via synthetic image generation component 608 using synthetic image generation model 112). At 804, method 800 further comprises updating, by the system, the medical image inferencing model using the synthetic images and a model updating process (e.g., via refinement component 606). In accordance with one or more embodiments of method 800, the feedback information comprises non-image data regarding attributes of at least some of the medical images, and wherein the feedback information excludes the medical images. The feedback information can also comprise non-image data relating to results of the medical image inferencing model. In this regard, the feedback information comprises text data and wherein the generating comprises employing a synthetic image generation model that generates the synthetic images based on the text data and without input data comprising the image data or additional image data. In some embodiments of method 800, the medical image inferencing model comprises a first machine learning model that was trained on a training dataset comprising first medical images and wherein the synthetic image generation model comprises a second machine learning model was trained on training textual description data associated with the first medical images.

FIG. 9 illustrates a block diagram of an example, non-limiting computer implemented method 900 for refining or updating medical image inferencing models post deployment using synthetic images generated from non-image data feedback, in accordance with one or more embodiments of the disclosed subject matter. Repetitive description of like elements employed in respective embodiments is omitted for sake of brevity.

At 902, method 900 comprises receiving, by a system comprising a processor (e.g., vendor system 600 or the like) non-image feedback information (e.g., feedback information 132) describing attributes of medical images processed by a medical image inferencing model (e.g., task-specific model 118) in a deployment environment. At 904, method 900 further comprises generating, by the system, synthetic versions (e.g., synthetic images 114, synthetic images 510, and the like) of the medical images using a synthetic image generation model (e.g., synthetic image generation model 112) and the non-image feedback information (and/or text input 136 generated from the non-image feedback information) as input to the synthetic image generation model (e.g., via synthetic image generation component 608). At 906, method 900 further comprises updating, by the system, the medical image inferencing model using the synthetic versions and a model updating process (e.g., via refinement component 606). In one or more embodiments, the medical image inferencing model comprises a first machine learning model that was trained on a training dataset comprising first medical images and the synthetic image generation model comprises a second machine learning model that was trained on training textual description data associated with the first medical images, wherein the synthetic image generation model generates the synthetic images based only on text input.

EXAMPLE OPERATING ENVIRONMENTS

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 9, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 10:
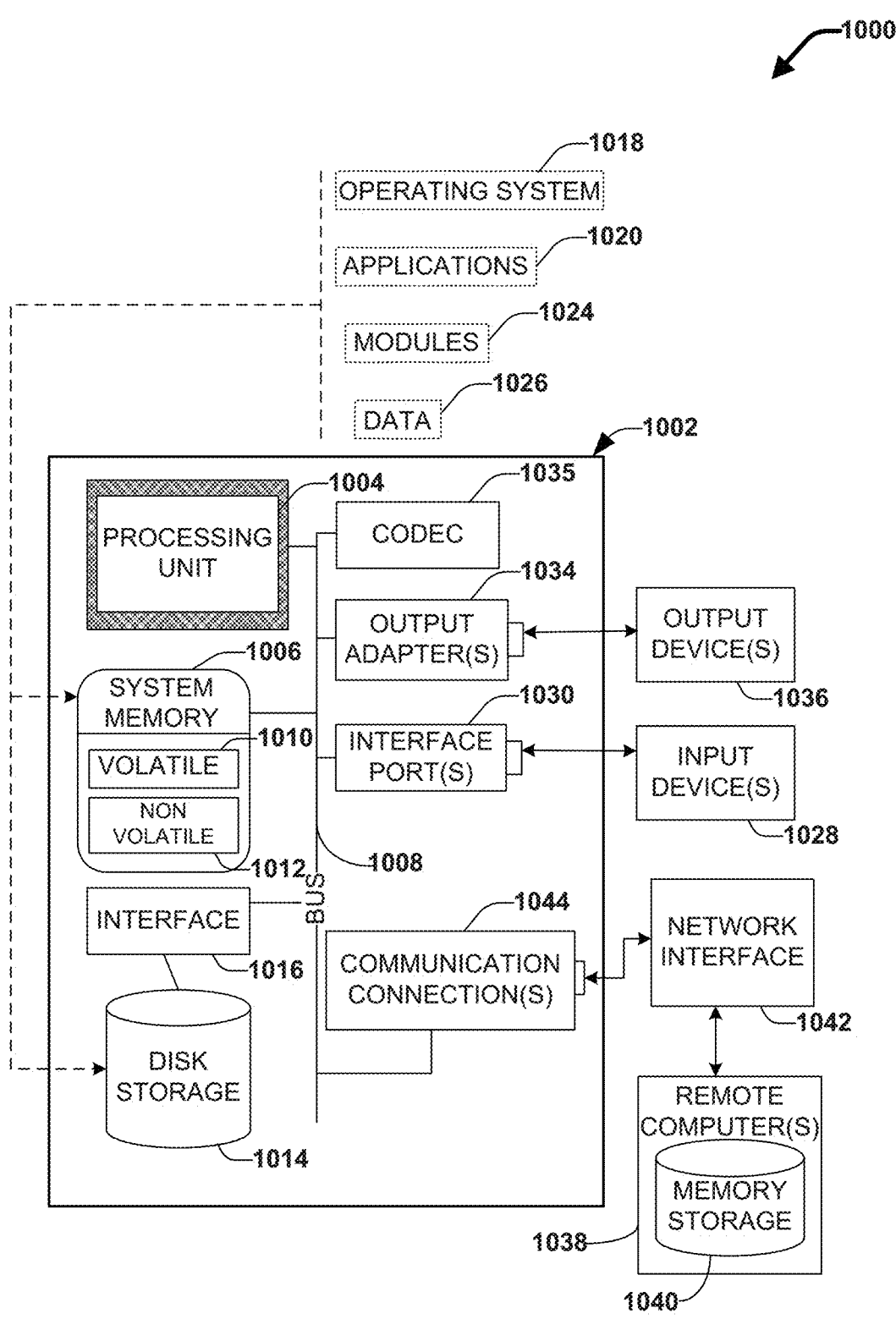
FIG. 10 illustrates a block diagram of an example, non-limiting operating environment in which one or more embodiments described herein can be facilitated.

With reference to FIG. 10, an example environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13104), and Small Computer Systems Interface (SCSI).

The system memory 1006 includes volatile memory 1010 and non-volatile memory 1012, which can employ one or more of the disclosed memory architectures, in various embodiments. The basic input/output system (BIOS), containing the basic routines to transfer information between elements within the computer 1002, such as during start-up, is stored in non-volatile memory 1012. In addition, according to present innovations, codec 1035 can include at least one of an encoder or decoder, wherein the at least one of an encoder or decoder can consist of hardware, software, or a combination of hardware and software. Although, codec 1035 is depicted as a separate component, codec 1035 can be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1012 can employ one or more of the disclosed memory devices, in at least some embodiments. Moreover, non-volatile memory 1012 can be computer memory (e.g., physically integrated with computer 1002 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1010 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1002 can also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD), flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1014 to the system bus 1008, a removable or non-removable interface is typically used, such as interface 1016. It is appreciated that disk storage 1014 can store information related to a user. Such information might be stored at or provided to a server or to an application running on a user device. In one embodiment, the user can be notified (e.g., by way of output device(s) 1036) of the types of information that are stored to disk storage 1014 or transmitted to the server or application. The user can be provided the opportunity to opt-in or opt-out of having such information collected or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1010. Operating system 1010, which can be stored on disk storage 1014, acts to control and allocate resources of the computer 1002. Applications 1020 take advantage of the management of resources by operating system 1010 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port can be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
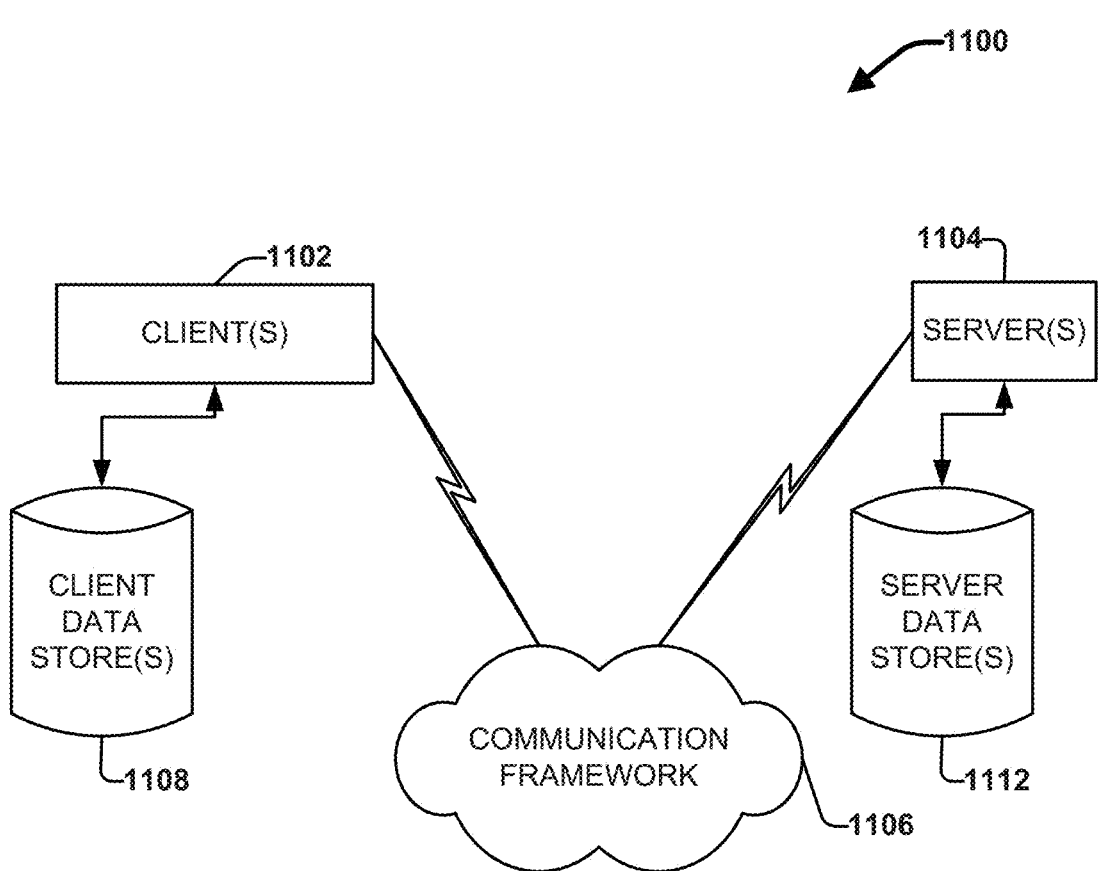
FIG. 11 illustrates a block diagram of another example, non-limiting operating environment in which one or more embodiments described herein can be facilitated.

FIG. 11 is a schematic block diagram of a sample-computing environment 1100 with which the subject matter of this disclosure can interact. The system 1100 includes one or more client(s) 1102. The client(s) 1102 (e.g., corresponding to client system 700 in some embodiments) can be hardware and/or software (e.g., threads, processes, computing devices). The system 1100 also includes one or more server(s) 1104 (e.g., corresponding to vendor system 600 in some embodiments). Thus, system 1100 can correspond to a two-tier client server model or a multi-tier model (e.g., client, middle tier server, data server), amongst other models. The server(s) 1104 can also be hardware and/or software (e.g., threads, processes, computing devices). The servers 1104 can house threads to perform transformations by employing this disclosure, for example. One possible communication between a client 1102 and a server 1104 may be in the form of a data packet transmitted between two or more computer processes (e.g., comprising feedback information 132 for instance).

The system 1100 includes a communication framework 1106 that can be employed to facilitate communications between the client(s) 1102 and the server(s) 1104. The client(s) 1102 are operatively connected to one or more client data store(s) 1108 that can be employed to store information local to the client(s) 1102. Similarly, the server(s) 1104 are operatively connected to one or more server data store(s) 1112 that can be employed to store information local to the servers 1104.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory that stores computer-executable components; and
a processor that executes the computer-executable components stored in the memory, wherein the computer-executable components comprise:
a synthetic image generation component that generates, using a synthetic image generation model, synthetic medical images based on feedback information associated with performance of a medical image inferencing model received in association with application of the medical image inferencing model to medical images in a deployment environment, wherein the feedback information comprises text data and wherein the synthetic image generation model generates the synthetic images based on the text data and without input data comprising image data;
a refinement component that updates the medical image inferencing model using the synthetic images and a model updating process.

2. The system of claim 1, wherein the feedback information comprises non-image data regarding attributes of at least some of the medical images, and wherein the feedback information excludes the medical images.

3. The system of claim 2, wherein the at least some of the medical images correspond to a subset of the medical images for which the performance of the medical image inferencing model is associated with one or more negative performance criteria.

4. The system of claim 1, wherein the feedback information comprises non-image data relating to results of the medical image inferencing model.

5. The system of claim 1, wherein the synthetic image generation model comprises a machine learning model.

6. The system of claim 1, wherein the model updating process comprise a machine learning process.

7. The system of claim 1, wherein the medical image inferencing model comprises a first machine learning model that was trained on a training dataset comprising first medical images, wherein the synthetic image generation component generates the synthetic medical images using a second machine learning model that generates the synthetic medical images based on textual description data and without input data comprising the image data or additional image data, and wherein the second machine learning model was trained on training textual description data associated with the first medical images.

8. The system of claim 7, wherein the computer-executable-components further comprise:
a training component that trains the first machine learning model and the second machine learning model.

9. The system of claim 1, wherein the feedback information comprises automated assessment data regarding an assessment of at least one of, the performance, at least some of the medical images, or results of the medical image inferencing model, the automated assessment data generated using one or more artificial intelligence assessment models.

10. The system of claim 1, wherein the feedback information comprises metadata associated with at least some of the medical images.

11. The system of claim 1, wherein the feedback information comprises clinical report data associated with at least some of the medical images.

12. The system of claim 1, wherein the feedback information comprises user provided feedback regarding an assessment of at least one of, the performance, at least some of the medical images, or results of the medical image inferencing model.

13. The system of claim 12, wherein the computer-executable components further comprise:

a feedback component that facilitates receiving the user provided feedback using one or more feedback tools associated with a medical imaging application in association with reviewing the results using the medical imaging application.

14. A method, comprising:

generating, by a system comprising a processor and using a synthetic image generation model, synthetic medical images based on feedback information associated with performance of a medical image inferencing model received in association with application of the medical image inferencing model to medical images in a deployment environment, wherein the feedback information comprises text data and wherein the synthetic image generation model generates the synthetic images based on the text data and without input data comprising image data;

updating, by the system, the medical image inferencing model using the synthetic images and a model updating process.

15. The method of claim 14, wherein the feedback information comprises non-image data regarding attributes of at least some of the medical images, and wherein the feedback information excludes the medical images.

16. The method of claim 14, wherein the feedback information comprises non-image data relating to results of the medical image inferencing model.

17. The method of claim 14, wherein the synthetic image generation model comprises a machine learning model.

18. The method of claim 14, wherein the medical image inferencing model comprises a first machine learning model that was trained on a training dataset comprising first medical images and wherein the synthetic image generation model comprises a second machine learning model was trained on training textual description data associated with the first medical images.

19. A non-transitory machine-readable storage medium, comprising executable instructions that, when executed by a processor, facilitate performance of operations, comprising:

generating, using a synthetic image generation model, synthetic medical images based on feedback information associated with performance of a medical image inferencing model received in association with application of the medical image inferencing model to medical images in a deployment environment, wherein the feedback information comprises text data and wherein the synthetic image generation model generates the synthetic images based on the text data and without input data comprising image data; and updating the medical image inferencing model using the synthetic images and a model updating process.

20. The non-transitory machine-readable storage medium of claim 19, wherein the medical image inferencing model comprises a first machine learning model that was trained on a training dataset comprising first medical images and wherein the synthetic image generation model comprises a second machine learning model was trained on training textual description data associated with the first medical images.

*    *    *    *    *